(12) United States Patent
Sches et al.

(10) Patent No.: US 6,789,823 B2
(45) Date of Patent: Sep. 14, 2004

(54) TUBULAR THREADED JOINT WITH REINFORCED STOP

(75) Inventors: Celine Sches, Famars (FR); Masaaki Sugino, Amagasaki (JP); Emmanuel Varenne, Villefranche-sur-Saone (FR); Miyuki Yamamoto, Izumiotsu (JP)

(73) Assignees: Vallourec Mannesmann Oil & Gas France, Aulnoye-Aymeries (FR); Sumitomo Metal Industries, Osaka (JP)

( * ) Notice: Subject to any disclaimer, the term of this patent is extended or adjusted under 35 U.S.C. 154(b) by 0 days.

(21) Appl. No.: 10/049,909

(22) PCT Filed: Jun. 18, 2001

(86) PCT No.: PCT/FR01/01897

§ 371 (c)(1),
(2), (4) Date: Jun. 24, 2002

(87) PCT Pub. No.: WO01/98620

PCT Pub. Date: Dec. 27, 2001

(65) Prior Publication Data

US 2003/0067168 A1 Apr. 10, 2003

(30) Foreign Application Priority Data

Jun. 20, 2000 (JP) ........................................ 2000-185020
Dec. 22, 2000 (FR) ............................................ 00/16866

(51) Int. Cl.$^7$ ............................................. F16L 25/00
(52) U.S. Cl. ........................................ 285/333; 285/334
(58) Field of Search ................................ 285/333, 334, 285/355, 390

(56) References Cited

U.S. PATENT DOCUMENTS

| | | | |
|---|---|---|---|
| 2,239,826 A | * | 4/1941 | Neuhaus ...................... 285/119 |
| 2,532,632 A | * | 12/1950 | MacArthur .................. 285/55 |
| 4,377,302 A | | 3/1983 | Kohyama et al. |
| 4,619,472 A | | 10/1986 | Kozono et al. |
| 4,623,173 A | * | 11/1986 | Handa et al. ................ 285/333 |
| 4,629,224 A | | 12/1986 | Landriault |
| 4,732,416 A | * | 3/1988 | Dearden et al. ............ 285/333 |
| 4,984,829 A | | 1/1991 | Saigo et al. |
| 5,007,665 A | | 4/1991 | Bovisio et al. |
| 5,029,906 A | * | 7/1991 | Chelette et al. ............. 285/113 |
| 5,137,310 A | * | 8/1992 | Noel et al. ................... 285/333 |
| 5,253,902 A | | 10/1993 | Petelot et al. |
| 5,549,336 A | | 8/1996 | Hori et al. |
| 5,649,725 A | | 7/1997 | Nagasaku et al. |

(List continued on next page.)

FOREIGN PATENT DOCUMENTS

| | | |
|---|---|---|
| DE | 10042209 | 3/2001 |
| EP | 0 488 912 | 6/1992 |
| EP | 0 916 883 | 5/1999 |
| FR | 1 488 719 | 10/1967 |
| FR | 1 489 013 | 11/1967 |
| FR | 2798716 | 3/2001 |
| GB | 2356230 | 5/2001 |
| WO | 94 29627 | 12/1994 |
| WO | 00 14441 | 3/2000 |

*Primary Examiner*—Lynne H. Browne
*Assistant Examiner*—James M. Hewitt
(74) *Attorney, Agent, or Firm*—Oblon, Spivak, McClelland, Maier & Neustadt, P.C.

(57) ABSTRACT

A male threaded joint tipped with a male lip having a male seating face and a male stop transverse surface proximate to the male seating face. A female threaded element includes for co-operation with the corresponding male threaded element, a female seating face and a female stop transverse surface provided on a female shoulder and proximate to the female seating face. The annular female shoulder zone is subjected to axial compression forces resulting from the pressure of the male and female stop surfaces and has an inner peripheral surface, the diameter of which is at least locally proximate to the female stop surface smaller than the diameter of the inner peripheral surface of the male lip. The ratio R of the two diameters is less than 1 but not less than 0.9.

12 Claims, 3 Drawing Sheets

U.S. PATENT DOCUMENTS

| | | |
|---|---|---|
| 5,769,466 A | 6/1998 | Noel et al. |
| 5,829,797 A * | 11/1998 | Yamamoto et al. ......... 285/333 |
| 6,045,165 A | 4/2000 | Sugino et al. |
| 6,273,474 B1 * | 8/2001 | DeLange et al. ............. 285/55 |
| 6,481,760 B1 * | 11/2002 | Noel et al. ................... 285/334 |
| 6,557,906 B1 | 5/2003 | Carcagno |
| 6,609,735 B1 * | 8/2003 | DeLange et al. ........... 285/334 |

* cited by examiner

TUBULAR THREADED JOINT WITH REINFORCED STOP

BACKGROUND OF THE INVENTION

The invention relates to tubular threaded connections comprising a male threaded element located at the end of a first tubular component and connected by screwing onto a female threaded element located at the end of a second tubular component.

Such connections are used in particular to constitute casing strings or production tubing strings or drill strings for hydrocarbon wells or for geothermal wells.

The male and female threaded elements can each be located at one end of great length pipes, the male threaded element of a first pipe being screwed into the female threaded element of a further pipe to constitute an integral threaded connection.

Alternatively, the male threaded elements can be disposed at each of the two ends of great length pipes, these being connected by a short length pipe or coupling the ends of which carry two female threaded elements: such a connection between two great length pipes is known as a "threaded and coupled connection" and employs two tubular threaded connections.

More particularly, the invention relates to threaded connections known as premium connections, which comprise radially interfering metal—metal sealing surfaces associated with abutting surfaces intended in particular to precisely position said sealing surfaces.

Such premium threaded connections are described, for example, in European patent EP 488 912, and enable to ensure the seal of the threaded connections against fluids in different service configurations (axial tension or compression, internal or external pressure, bending, etc.).

Recent techniques for drilling deviated wells at an inclined or even horizontal angle necessitate rotating the pipes and threaded connections connecting them as they drop into the well.

Such techniques require making up the threaded connections at high makeup torques, always substantially higher than the torque employed when dropping into the well, failing which the position of the sealing surfaces might be altered and the connection might leak.

Because of the desired torques, and the bending loads in portions that are bent by the geometry of the well (deviated wells), the abutting surfaces are subjected to large loads.

In the more particular case of casing strings or tubing strings, a well is provided with a plurality of concentric strings of pipes and the internal and external diameters of the constituents of the strings are necessarily limited to admit a maximum number of strings into the well.

Abutting surfaces, which are surfaces on the threaded elements that are oriented substantially perpendicular to the axis, are thus of a limited radial thickness and in the case of such threaded connections, are subjected to very high stresses that may result in unacceptable plastication.

International patent documents WO 94/29627 and WO 00/14441 disclose tubular threaded connections allowing makeup at a very high torque, which cause the flanks of the threads to completely or partially act as abutments.

SUMMARY OF THE INVENTION

The aim of the present invention is to produce a premium tubular threaded connection with a pair of male and female abutting surfaces that are particularly resistant to plastication without causing the thread flanks to act as abutments.

The aim of the present invention is to be applicable to premium tubular threaded connections with one or more abutments for each threaded element, but in which the principal abutment (which comes into abutting contact first and is under the most stress) is produced on the male threaded element at its free front end, and in a corresponding manner on the female threaded element.

The aim of the present invention is also to be applicable to any type of thread, thread form or sealing surface form.

The tubular threaded connection of the invention comprises a male threaded element at the end of a first tubular component and a female threaded element at the end of a second tubular component.

The male threaded element comprises a male threading and is terminated by a male lip.

The male lip comprises:

an external peripheral surface on which a male sealing surface is formed;

a male annular abutting surface that is substantially transversely oriented close to and connected to the male sealing surface and constituted by the front surface of the free end of the male threaded element;

an internal peripheral surface.

The term "substantially transversely oriented surface" means both planar and non planar surfaces, for example conical surfaces, the generatrix of which does not extend more than 30° with respect to a plane normal to the axis of the threaded connection.

The female threaded element comprises so as to co-operate with corresponding means on the male threaded element a female threading, an internal peripheral surface carrying a female sealing surface, and a female shoulder.

The female shoulder has a female annular abutting surface that is substantially transversely oriented, close to and connected to said female sealing surface and defining a female annular shoulder zone that is subjected to axial compressive loads as said male abutting surface bears against said female abutting surface.

The male threading is made up into the female threading until said male abutting surface bears against said female abutting surface, said male sealing surface then interfering radially with said female bearing surface.

In accordance with one feature of the invention, the female annular shoulder zone comprises an internal peripheral surface, the internal diameter of which is smaller than the diameter of the internal peripheral surface of the male lip at least in close proximity to said female abutment surface, the ratio R of these two diameters being less than 1 but higher or equal to 0.9.

Such a feature enables to reduce the equivalent von Mises stress in the female annular shoulder zone which is higher on numerous prior art threaded connections than the stress in the male abutment due according to the inventors to the tri-axiality of the stresses created by the neighbouring bearing surfaces: the principal stresses in the male abutment are all compressive while in the female annular shoulder zone, only the axial stress is a compressive stress, the two other principal stresses being tensile stresses.

This feature also enables to keep a sufficient internal diameter for passage inside the threaded tubular connection.

In some of their figures Patents FR 1 488 719 and FR 1 489 013 disclose a threaded tubular connection with abutting surfaces and sealing surfaces and provided with a male lip at the end of the male threaded element and a female shoulder on the female threaded element, the internal diameter of the internal peripheral surface of the female annular shoulder zone being in close proximity to said female abutting surface smaller than the diameter of the internal peripheral surface of the male lip.

No limit of value has been given in those two documents as regards the ratio of those diameters.

Furthermore in patent FR 1 489 013, no function is linked to the difference in internal diameter; it can only be assumed that the smaller diameter of the internal peripheral surface of the female annular shoulder zone results from the upsetting of the pipe for making the threaded female element.

In the case of Patent FR 1 488 719 dealing with threaded connections for casing tubes, the female annular shoulder zone has an internal diameter smaller than the male lip in order to avoid damaging the male lips and consequently the seal of the threaded connection by shocks during the dropping of the drill pipes inside the casing tube string. Thus the function of the difference in internal diameter is quite else than in the case of the present invention.

Preferably, ratio R satisfies the following relationship:

$$\sqrt{1.7-0.7S^2} \leq R \leq \sqrt{1.2-0.2S^2},$$

in which S equals the ratio between the diameter of the external edge of said male abutting surface and the internal diameter of the male lip.

This feature tends to minimise the differences in equivalent stress between the male abutment and the female annular shoulder zone and thus to optimise the geometry of the threaded connection of the invention.

Advantageously, the internal peripheral surface of the female shoulder of the threaded connection of the invention has a minimum diameter at a point where said internal peripheral surface intercepts a tapered surface of maximum shearing defined as follows:

it is a tapered surface with a vertex half-angle of 45° coaxial with the female threaded element;
  its diameter decreases in the female shoulder zone as the distance increases from said female abutting surface; and
  it passes through the external edge of said female abutting surface.

Advantageously again, at its end on the side of said female abutting surface, the diameter of the internal peripheral surface of the female shoulder is equal to the internal diameter of the internal peripheral surface of the male lip.

Preferably, the internal peripheral surface of the female shoulder comprises a first portion called a transition portion the internal diameter of which gradually decreases from said female abutting surface, and a second cylindrical portion with a minimum internal diameter.

A junction point can be defined between the transition portion and the cylindrical portion of the internal peripheral surface of the female shoulder.

Preferably again, this junction point is located substantially mid-way axially between on the one hand the end of said transition portion on the side of said female abutment surface and on the other hand the point of intersection of the internal peripheral surface of the female shoulder with the tapered surface of maximum shear.

Further advantages and characteristics of the invention will become clear from the following detailed description and accompanying drawings.

DETAILED DESCRIPTION OF THE INVENTION

Figure 1:
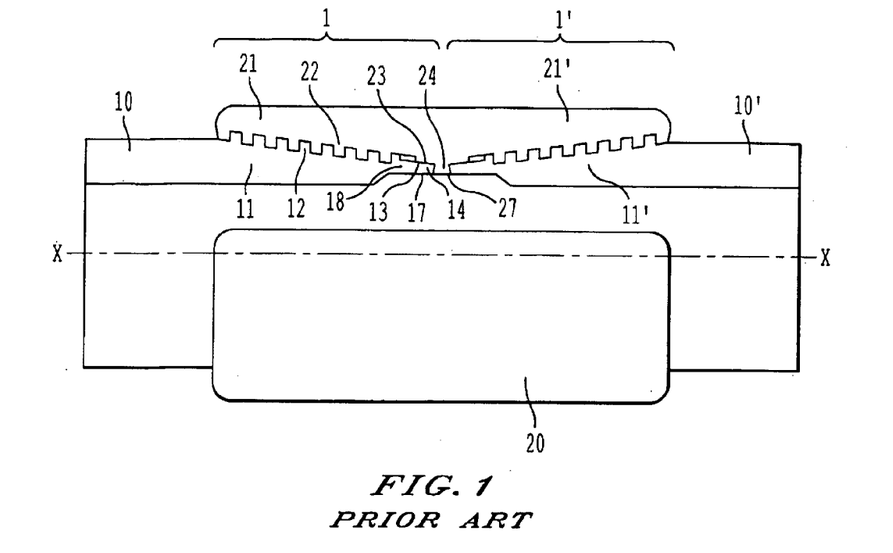
FIG. 1 shows a prior art threaded and coupled connection.
Figure 2:
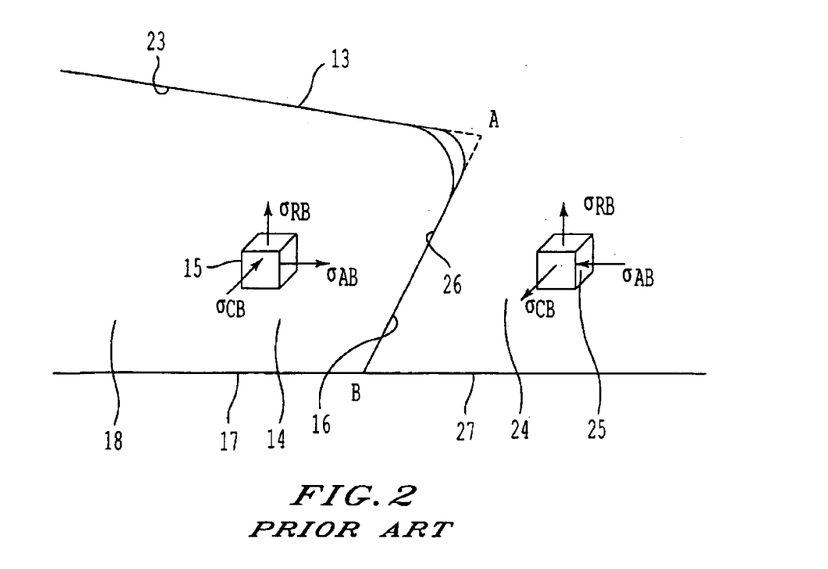
FIG. 2 shows a detail of the male and female abutments of a threaded connection of the assembly of FIG. 1.

FIGS. 1 and 2 show a prior art threaded and coupled connection between two great length steel pipes 10 and 10'.

Each end of pipes 10 and 10' carries a male threaded element 11, 11'.

The male element 11 comprises a male tapered threading 12 and terminates on the side of its free end by a male lip 18.

This male lip 18 comprises:

an external peripheral surface carrying a male tapered sealing surface 13 inclined, for example at 20° with respect to the axis XX of the male element;
  a substantially transversely oriented male annular abutting surface 16 constituted by the front surface of the free end of the male threaded element. The male abutting surface 16 is adjacent to the male sealing surface 13, and is connected to the latter by a toric surface with a low radius of the order of one millimeter to avoid making this junction fragile. Male abutment 14 in the example shown is an abutment termed a reverse abutment or a negative angle abutment wherein the abutting surface 16 is a concave tapered surface with a vertex half-angle of 75°, thus making an angle of 15° with respect to the normal to the axis XX;
  an internal peripheral surface 17 with an internal diameter $ID_P$ obtained by machining so that the axis of this surface 17 coincides with that of the male threaded element whatever the variations in the thickness of pipes 10. This surface 17 is connected on the one hand to the current internal peripheral surface of pipe 10 and on the other hand at B to the male abutting surface 16.

Pipes 10, 10' are made up using a coupling 20 comprising two female threaded elements 21, 21' symmetrically disposed at each end of coupling 20.

Female threaded elements 21, 21' comprise means disposed so as to co-operate with corresponding means of male threaded elements 11, 11' to constitute two tubular threaded connections 1, 1'.

In view of the symmetry of the connection, only threaded connection 1 will be described.

Female threaded element 21 comprises a female threading 22 corresponding to male threading 12, an internal peripheral surface comprising a tapered female sealing surface 23 and a female shoulder provided with a substantially transversely oriented female annular surface 26 formed by a convex tapered surface with a 75° vertex half-angle.

The surface of the female abutment 26 is adjacent to the female sealing surface 23 and is connected thereto by a toric surface with a small radius of curvature to prevent this junction from becoming fragile, as is also the case with the male threaded element.

Point A characterizes the external edge of the female abutting surface 26 and thus the root of the female shoulder on the side of the female sealing surface 23. It merges with the external edge of the male abutting surface 16.

In the made up position of the threaded connection, male threading 12 is screwed into female threading 22 until the male threading 14 abuts with the female abutment 24 under contact pressure.

The quasi-transverse disposition of the abutting surfaces 16, 26 allows the male threaded element 11 to be positioned relative to the female threaded element 21, this relative position being very precisely defined by the amount of makeup torque.

In the made-up position of the threaded connection, male sealing surface 13 radially interferes with female sealing surface 23, meaning that, for the corresponding straight sections of the male and female sealing surfaces, the male bearing diameter is slightly larger than the female bearing diameter before makeup.

Such a radial interference generates a high contact pressure between sealing surfaces 13, 23. This contact pressure can render the threaded connection tight to internal or external fluids despite a variety of stresses (internal or external pressure, tension, compression, torsion, bending, with or without cyclic temperature variation, etc.), either singly or in combination.

A high makeup torque is desirable to prevent the male threaded element 11 from rotating with respect to the female threaded element 21, in particular if the pipe string is rotated as it descends into the well.

This makeup torque results in axial compression of the metal of abutments 14, 24 and must not result in plastication thereof.

Further, with deviated wells, bending stresses induce additional compressive loads on the abutments.

This can also be the case if the pipe string is subjected to axial compressive loads and/or to thermal cycles.

In general, as shown in FIGS. 1 and 2, in prior art threaded connections, the top of the female shoulder has a cylindrical internal peripheral surface 27 with the same internal diameter as the male internal peripheral surface 17 of male lip 18.

This can prevent:

turbulence in fluid circulating internally, in particular at the junction between male threaded element 11 and female threaded element 21, which turbulence generates an erosion-corrosion phenomenon; and blockage or damage at this junction of tools or apparatus dropped into the pipe string during operation.

The inventors designated in the present document have surprisingly observed that during over-torquing tests with threaded connections as shown in FIGS. 1 and 2, the metal in female annular shoulder zone 24 was always plasticated before that of male abutment 14.

The explanation they have found invokes the influence of the presence of the sealing surface adjacent to the abutments on the tri-axiality of the stresses as shown in FIG. 2.

Consider an elementary cube of metal 15 in the male abutment 14. This cube 15 is subjected to a set of stresses that can be reduced to three principal stresses $\sigma_{AP}$, $\sigma_{RP}$ and $\sigma_{CP}$, in the axial, radial and circumferential directions respectively.

The axial stress $\sigma_{AP}$ essentially originates from the makeup torque and is a compressive stress (negative sign).

The radial stress $\sigma_{RP}$ principally results from radial interference between sealing surfaces 13, 23 and is also a compressive stress. The negative angle of reverse abutment surfaces 16, 26 tends to reinforce the radial interference effect of the sealing surfaces on the radial stress $\sigma_{RP}$.

The circumferential stress $\sigma_{CP}$ also principally results from radial interference between the sealing surfaces 13, 23 which tend to restrict the diameter of the male lip such that the circumferential stress $\sigma_{CP}$ is still a compressive stress, the intensity of which also being reinforced by the reverse disposition of abutments 14, 24.

Consider an elementary metal cube 25 in the annular zone 24 of the female shoulder, this cube 25 being subjected to a set of three principal stresses such that:

the axial stress $\sigma AB$ is also a compressive stress (negative value).

the radial stress $\sigma_{RB}$, principally resulting from the influence of the radial interference on the female sealing surface 23 (and incidentally on the reverse abutting surface 26), is a tensile stress (positive value).

the circumferential stress $\sigma_{CB}$ also resulting from radial interference on the female sealing surface 23 and the reverse abutting surface 26 and is also a tensile stress (positive value).

According to known theories of material plasticity, plastic deformation commences when an equivalent stress such as the von Mises stress, which is a function of the algebraic differences between the principal stresses taken two at a time, is higher than the yield strength of the material.

The equivalent von Mises stress is relatively low for elementary cube 15 in male abutment 14 since the three principal stresses $\sigma_{AP}$, $\sigma_{RP}$ and $\sigma_{CP}$ have the same sign; in contrast it is relatively high for the elementary cube 25 in the female annular shoulder zone 24 since two of the principal stresses ($\sigma_{RB}$, $\sigma_{CB}$) are positive (tensile) while the third ($\sigma_{AB}$) is negative (compressive).

Thus on over-torquing the threaded connection, the equivalent stress in the elementary cube 25 of the female shoulder will more quickly be susceptible of exceeding the yield strength of the material than the equivalent stress of an elementary cube 15 of the male abutment 14.

The inventors designated in the present application have concluded that it would be advantageous either to locally increase the yield strength of the metal in the female annular shoulder zone 24, for example by induction hardening or by pre-stress shot blasting, or by reducing the equivalent stress at the female annular shoulder zone 24 undergoing axial compression by increasing the surface area over which these stresses are exerted.

Figure 3:
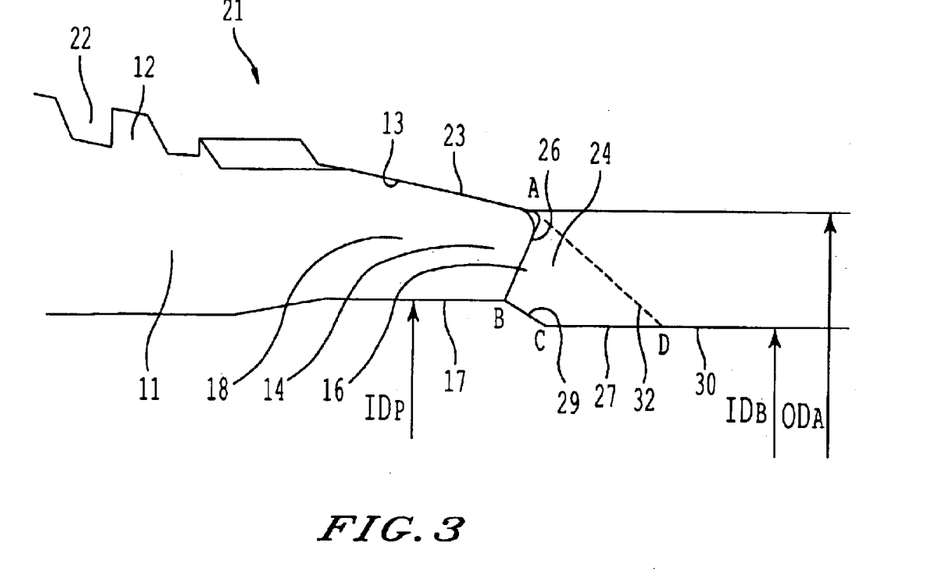
FIG. 3 shows a detail of a threaded connection of the invention.
Figure 4:
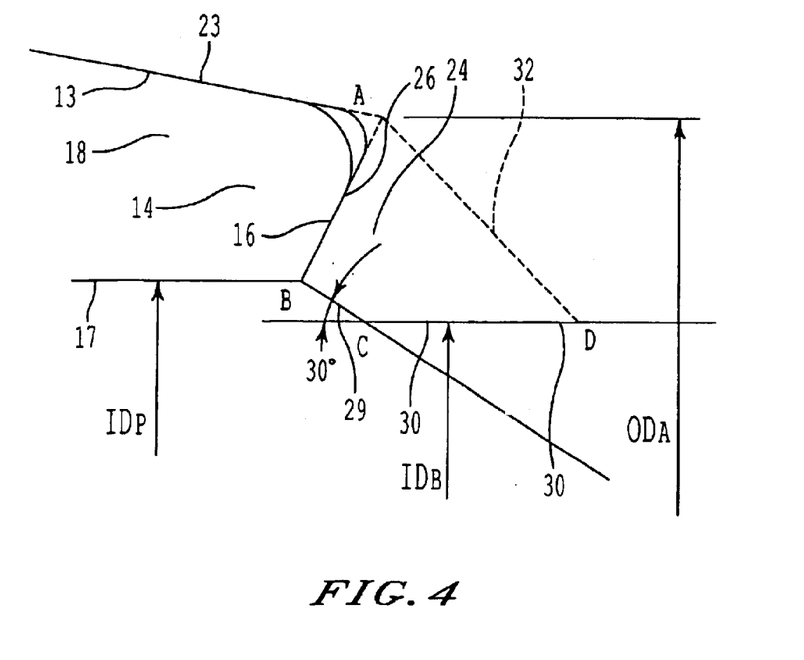
FIG. 4 shows a detail, at a higher magnification, of FIG. 3.
Figure 5:
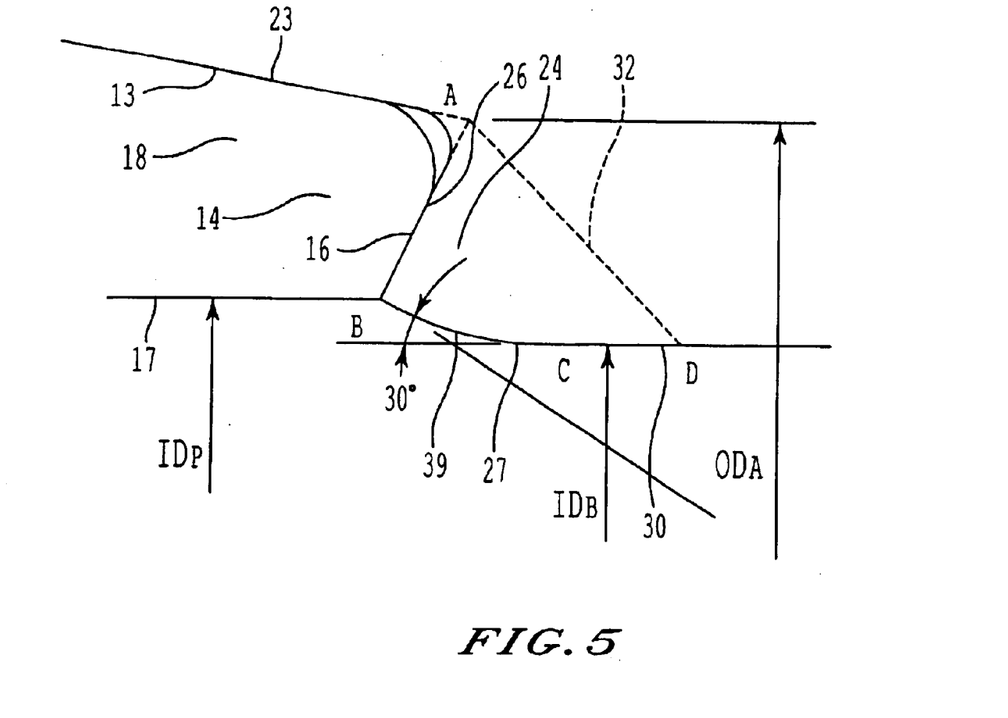
FIG. 5 shows a variation of FIG. 4.

Taking into account the difficulties for carrying out a heat treatment or mechanical treatment inside a coupling, the inventors elected to thicken the female shoulder section, as shown in FIGS. 3, 4 or 5.

FIGS. 3 and 4 differ from FIG. 2 in that the female annular shoulder zone 24 is rendered thicker on the internal side such that the minimum internal diameter ID of the internal peripheral surface 27 is locally smaller than the internal diameter $ID_P$ of the internal peripheral surface 17 of the male lip 18.

The internal peripheral surface 27 of the female shoulder is a cylindro-conical surface with a first tapered portion 29 termed a "transition portion" on the female abutting surface side 26, and a second cylindrical portion 30 with diameter $ID_B$.

The tapered surface 29 is coaxial with the female threaded element, its vertex half-angle θ is 30° and its diameter decreases as the distance increases from the female abutment surface 26. The internal diameter of the tapered surface 29 at its end B on the female abutting surface side 26 is equal to the internal diameter $ID_P$ of the internal peripheral surface 17 of the male lip such that on passing from the male threaded element 11 to the female threaded element 21, there is no variation in internal diameter.

The angle θ is less than 45° to limit the risk of turbulence in the flow of fluid circulating internally and the risks of a tool dropped inside the pipe string becoming snagged. We shall see below why it is useful to fix a lower limit for the angle θ.

The tapered surface 29 thus makes a gradual junction between the internal peripheral surface 17 of the male lip and the cylindrical portion 30 of the internal peripheral surface 27 of the female shoulder.

The diameter $ID_B$ of the cylindrical portion 30 of the internal peripheral surface 27 of the female shoulder is, of course, less than the value $ID_P$, otherwise there would be not reinforcement of the female abutment 24.

The diameter $ID_B$ is 0.9 $ID_P$ or more to preserve a sufficient cross-section of flow inside the string. A diameter $ID_B$ of less than 0.9 $ID_P$ would only allow a few pipe strings to be inserted one inside the other and such a string design would then be extremely expensive.

Knowing that it is useless to thicken the female annular shoulder zone 24 beyond a diameter $ID_B$ for which the female abutment is as strong as the male abutment 14, the inventors have found that the ratio R between $ID_B$ and $ID_P$ should be in the range $\sqrt{1.7-0.7S^2}$ and preferably equal to $\sqrt{1.3-0.3S^3}$ in which S equals the ratio $OD_A/ID_P$ and $OD_A$ is the diameter of the external edge of the male abutting surface 16; this diameter is equal to the diameter passing through point A located at the root of female shoulder 24.

Values for R of the order of 0.95 to 0.98 are obtained depending on the current values of $ID_P$ and $OD_A$.

Advantageously, the diameter $ID_B$ is larger than the "drift" diameter specified by the API or by tubular threaded connection manufacturers for pipes of a given dimension, drift being monitored by displacing a mandrel with a given diameter in connected pipes to ensure that the pipe string enables to drop tools up to a given diameter of the latter without running the risk of those tools becoming blocked. The internal diameter of pipes 10, 10', in particular in their current portion, must thus be larger than the drift diameter.

The inventors have also discovered that, in accordance with FIG. 3, it is not useful to thicken the shoulder over the whole axial length of the internal peripheral surface 27.

They have noted that the most deformed zone of the female annular shoulder zone 24 is the tapered surface 32 coaxial with the female threaded element passing through point A at the root of the female shoulder on the female bearing surface 23 side, with a vertex half-angle of about 45° and with a diameter in the female annular shoulder zone 24 that decreases as the distance increases from the abutting surface 26.

Deformations along this tapered surface are shear deformations and the inventors have discovered that the shear stresses can be minimised by producing a minimum internal diameter $ID_B$ at the intersection at D between this tapered surface 32 of maximum shear and the internal peripheral surface 27 of the female shoulder.

Thus it is understood that, if the angle θ of the tapered surface 29 is less than 15°, it is possible for the maximum shear taper 32 to intercept the internal peripheral surface 27 in the tapered portion 29 where the diameter is not the minimum internal diameter $ID_B$ with the result that the cylindrical portion 30 with diameter $ID_B$ is thickened unnecessarily.

It is advantageous for point C joining surfaces 29 and 30 to be located substantially halfway between points B and D.

FIG. 5 shows a variation of FIG. 4 in which the transition portion is not a tapered surface but a toric surface 39 coaxial with the female threaded element.

In longitudinal cross section as shown in FIG. 5, this toric surface 39 appears as an arc of a circle:
  with a radius of about 10 mm;
  wherein the centre is directed towards the material of the female threaded element;
  passing through the point B of junction with the internal peripheral surface 17 of the male lip;
  wherein the tangent at B makes an angle of 30° with the axis XX of the threaded elements thus also with the generatrix of the internal peripheral surface 17;
  with a tangent at C to the cylindrical portion 30 of the internal peripheral surface 27 of the female shoulder.

Such a toric surface also makes a continuous junction between the internal peripheral surface 17 and the cylindrical portion 30 with internal diameter $ID_B$ so that the angle of its tangent at B with axis XX is in the range 15° to 45°.

Other continuous forms for the transition portion of the internal peripheral surface of the female shoulder are possible, for example a set of two toric surfaces that are adjacent and tangential to each other, with opposed curvatures and tangents, one to the internal peripheral surface 17 at B and the other to the cylindrical surface 30 at C.

The scope of the present invention also encompasses sealing surfaces that are not immediately adjacent to the abutting surfaces 16, 26; further, FIGS. 2 to 5 show toric junction surfaces with a small radius of curvature between sealing surfaces 13, 23 and corresponding abutting surfaces 16, 26. Other types of surfaces can provide the junction within the scope of the present invention provided that the radial interference at the sealing surfaces induces radial tensile stresses and circumferential stresses in the female annular shoulder zone.

The present invention is applicable in a variety of threaded connection configurations, including:

integral or coupled threaded connections;

threaded connections for large or small diameter pipes (tubing strings or casing strings, for example);

connections with external abutments (the female abutment is at the free end of the female threaded element) or with several sets of abutments;

threaded connections with sealing surfaces that are either tapered or non tapered, for example toric for both threaded elements or toric for one threaded element and tapered for the opposed element;

threaded connections with straight (planar) abutting surfaces or with a negative angle; in the case of abutments termed reverse abutments or those with a negative angle, it is preferable in the latter case that the angle of the abutments with respect to the normal to axis XX of the threaded elements is 20° or less, preferably in the range 5° to 10°;

threaded connections with tapered or straight threadings, either single-step or multiple-step;

threaded connections with threads with a variety of shapes, such as triangular, round or trapezoidal threads;

threaded connections with threads of varying width.

EMBODIMENT EXAMPLES

First Example

Makeup-breakout tests were carried out on 2 series of VAM TOP® type threaded connections from VAM® catalogue n° 940, July 1994 from Vallourec Oil & Gas:

external pipe diameter: 177.8 mm (7");
pipe thickness: 10.36 mm (29 lb/ft);
external diameter at male end ($OD_A$): 170.8 mm;
internal diameter of male lip ($ID_P$): 161.3 mm;
drift diameter: 153.90 mm (6.059");
pipe grade: API L80 (yield strength 552 MPa or more).

The standard P series is in accordance with FIG. 2 and has a female internal diameter $ID_B$ of the female shoulder zone equal to the male internal diameter $ID_P$.

The Q series was modified in accordance with the invention and corresponds to the diagram of FIG. 5: reinforcement of the female abutment in this Q series results in a diameter $ID_B$ of the cylindrical portion 30 of 156.2 mm, higher than the drift diameter; the cylindrical portion 30 is preceded by a toric portion 39 with radius 10 mm such that the point of intersection D of the cone 32 of maximum shear with the female internal peripheral surface 27 occurs in the cylindrical portion 30 with internal diameter $ID_B$.

The ratio $R=ID_B/ID_P$ is equal to 0.97 for the Q series and well within the range (0.96–0.99) defined by claim 3 because of the value of $OD_A$.

During these makeup-breakout tests, the makeup torque was recorded as a function of the number of makeup turns, raising the maximum torque gradually at each makeup test by one cycle relative to the same series until the abutments plasticated.

In all of the makeup-breakout tests, the threadings, sealing surfaces and abutting surfaces were first coated with API 5A2 type grease.

Figure 6:
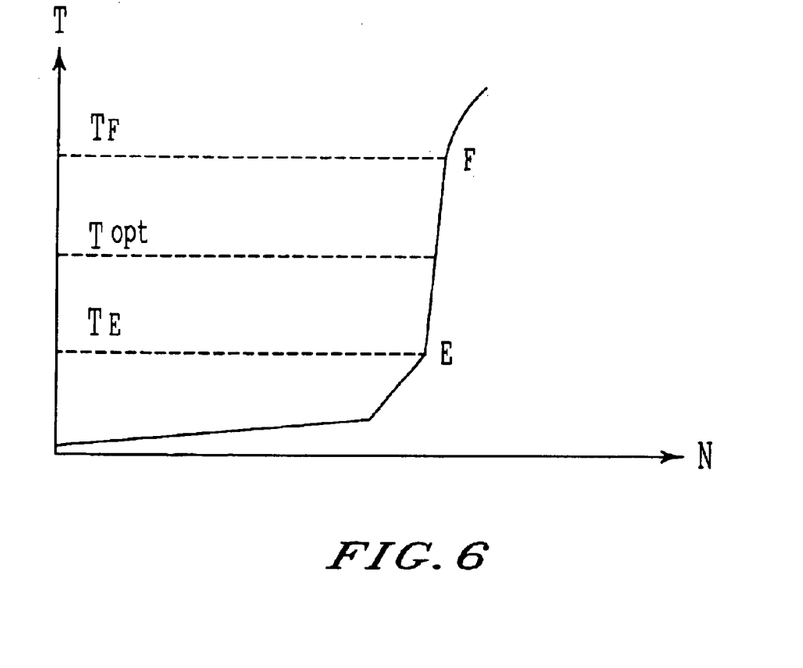
FIG. 6 is a graph for an over-torquing test showing the makeup torque as a function of the number of turns until the abutments deform.

FIG. 6 shows the graph of the makeup torque T as a function of the number of turns N for the last makeup test for a threaded connection from the Q series.

On this graph, the torque rises severely almost vertically beyond a point E (torque $T_E$) meaning the abutments meet. This severe rise is substantially linear until point F (torque $T_F$).

Beyond point F (non linear portion of the graph), plastic embedding of at least one of the pipes commences.

The value $T_{opt}$ corresponds to the recommended value for the makeup torque; this value is between $T_E$ and $T_F$.

TABLE 1

Makeup torque results

| Torque | P series (N.m) | Q series (N.m) |
|---|---|---|
| $T_E$ | 3300 | 8100 |
| $T_{opt}$ | 12740 | |
| $T_F$ | 21200 | 36600 |
| $T_F - T_E$ | 17900 | 28500 |

From the values in Table 1 it can be noted that the quantity ($T_F-T_E$), which measures the portion of the makeup torque carried by the abutments, was considerably increased (+60%) in the case of the threaded connections of the invention for the Q series with respect to the prior art threaded connections P.

Second Example

Tests on two dimensions A and B of VAM® ACE type threaded connections in L80 grade from the VAM® catalogue defined in the first example.

The characteristics of the test samples are shown in Table 2.

TABLE 2

Samples tested

| Sample | | Type A | Type B |
|---|---|---|---|
| Body of pipe | Ext. diam | 244.48 mm (9⅝") | 88.90 mm (3½") |
| | Thickness | 13.84 mm (53.5 lb/ft) | 6.45 mm (9.2 lb/ft) |
| | Length | 800 mm | 800 mm |
| Male lip | Internal diameter ($ID_P$) | 220.09 mm | 77.96 mm |
| | External end diameter ($OD_A$) | 235.7 | 83.88 |
| Coupling | External diameter | 266.24 mm | 98.80 mm |
| | Internal diameter $ID_B$ | 219.79 mm | 77.66 mm |
| | Length | 340 mm | 215 mm |
| Drift diameter | | 212.83 mm (8.379") | 72.82 mm (2.867") |
| Material | | Seamless pipe, carbon steel, yield strength ≧552 MPa | |
| Recommended makeup torque ($T_{opt}$)(*) | | 21575 N.m | 3825 N.m |

(*)with API 5A2 type grease.

Table 3 shows the internal diameters before and after makeup at the torque $T_{opt}$.

It can be seen that the internal diameter $ID_B$ is always higher than the drift diameter (see Table 2) both for the standard threaded connections (A3, B3) and for the connections that have been modified in accordance with the invention (A1, A2, B1, B2).

a) Table 4 shows the results of over-torquing tests up to plastication. The threadings, sealing surfaces and the abutting surfaces have been coated with API5A2 type grease.

TABLE 3

Results of internal diameter measurements

| | Male internal diameter $ID_P$ (mm) | | Female internal diameter $ID_B$ (mm) | | Ratio R (= $ID_B/ID_P$) | | Taper | |
|---|---|---|---|---|---|---|---|---|
| Sample no | Before makeup | After makeup | Before makeup | After makeup | Before makeup | After makeup | Chamfer angle (*) | Classification |
| A1 | 220.09 | 219.56 | 213.89 | 214.08 | 0.972 | 0.975 | 35° | Present invention |
| A2 | | | | | | | 10° | Comparative ex. |
| A3 | | 219.58 | 219.79 | 220.00 | 0.999 | B1.002 | | Prior art |
| B1 | 77.96 | 77.67 | 73.66 | 73.83 | 0.945 | 0.951 | 35° | Present invention |
| B2 | | | | | | | 10° | Comparative example |
| B3 | | 77.68 | 77.66 | 77.84 | 0.996 | 1.002 | | Prior art |

(*) (reference number 29, FIG. 4)

TABLE 4 results of over-torquing tests

| | Over-torquing test | |
|---|---|---|
| Sample no. | Torque $T_F$ at plastication point (N.m) | Abutment/shoulder, visual observation |
| A1 | 96079 | Neither deformation nor galling |
| A2 | 71905 | Plastic deformation of the female abutment |

TABLE 4-continued results of over-torquing tests

Over-torquing test

| Sample no. | Torque $T_F$ at plastication point (N.m) | Abutment/shoulder, visual observation |
|---|---|---|
| A3 | 68317 | Plastic deformation of the female abutment and the male end (point A) |
| B1 | 8414 | Galling of the female abutment without plastic deformation |
| B2 | 6100 | Plastic deformation of the female abutment |
| B3 | 4952 | Plastic deformation of the female abutment |

The over-torquing test results can be classified in decreasing order following in particular the criteria of the torque $T_F$ and the visual appearance of the abutments and shoulders:
1) female abutment reinforced with tapered chamfer at angle of 35° (tests A1, B1);
2) female abutment reinforced with tapered chamfer at angle of 10° (tests A2, B2);
3) standard female abutment (tests A3, B3).

The value of $T_F$ was 40% to 70% higher in A1 and B1 than the standard threaded connection; it was 5% to 23% higher than that of the standard threaded connection in A2 and B2.

The best results for threaded connections with a tapered chamfer at 35° compared to those with a tapered chamfer at 10° can be explained by the relative position of points C and D in FIG. 4.

In the case of threaded connections A1 and B1, point D in FIG. 4 is located beyond point C compared with point B and thus in the constant diameter zone with minimum diameter IDB while this is not the case for threaded connections A2 and B2: see Table 5:

TABLE 5

Relative position of points C and D

| Sample | Chamfer angle | Axial distance BC (mm) | BD (mm) | BC/BD | $ID_D/ID_P$ (*) | $ID_B/ID_P$ |
|---|---|---|---|---|---|---|
| A1 | 35° | 4.4 | 12.8 | 0.4 | 0.972 | 0.972 |
| A2 | 10° | 17.6 | 11.8 | 1.5 | 0.981 | 0.972 |
| B2 | 35° | 3.1 | 5.9 | 0.5 | 0.945 | 0.945 |
| B2 | 10° | 12.2 | 4.6 | 2.7 | 0.979 | 0.945 |

(*) $ID_D$ = internal diameter at point D

In the case of tests A and B1, point C is approximately half-way axially between points B and D.

b) Torsion Tests Under Internal Pressure

Similar threaded connections from series A and B were first made up at the recommended makeup torque ($T_{opt}$) of Table 2.

These threaded connections then underwent a combined stress intended to simulate rotational descent of connected pipes into a well, simultaneously applying:
a) an internal pressure of 43.7 MPa for samples A1 to A3 and 56.0 MPa for samples B1 to B3, such a pressure causing a stress in the body of the pipes equal to 80% of the specified minimum yield strength (552 MPa according to Table 2); and
b) a variable torsional moment.

Table 6 gives the value of the torque Tl beyond which the connections begin to leak.

TABLE 6

Results of torsional tests under internal pressure

| Sample n° | Value of leak torque Tl (N.m) |
|---|---|
| A1 | 93182 |
| A2 | 76068 |
| A3 | 71406 |
| B1 | 11807 |
| B2 | 8816 |
| B3 | 8149 |

It can be noted that the maximum torsional moment before leakage Tl is slightly increased (less than 10%) for the abutments reinforced with a 10° chamfer (samples A2, B2) compared with the prior art reference (samples A3, B3); in contrast, it is increased by 30% to 45% for abutments reinforced with a 35° chamfer (samples A1, B1).

c) Makeup-Breakout Cycles.

A sample A1 was subjected to 10 successive makeup-breakout cycles at a makeup torque of 1.5 times the recommended makeup torque shown in Table 2. No problems were encountered in recording the makeup-breakout torque and on visual inspection, the samples exhibited no anomalies after 10 makeup-breakout cycles.

What is claimed is:

1. A tubular threaded connection comprising:

a threaded male element at an end of a first tubular component;

a female threaded element at an end of a second tubular component;

the threaded male element including a male threading and ending in a male lip that comprises firstly an external peripheral surface on which a male sealing surface is formed, secondly a male annular abutting surface, oriented substantially transversely, located near and connected to said male sealing surface and constituted by a front surface of a free end of the male threaded element, and thirdly an internal peripheral surface, the female threaded element including, to co-operate with the male threaded element, a female threading, an internal peripheral surface on which a female sealing surface is formed, and a female shoulder having a female annular abutting surface oriented substantially transversely, located near and connected to said female sealing surface, and defining a female annular shoulder zone subjected to axial compressive loads when said male abutting surface bears against said female abutting surface, the male threading being screwed into the female threading until said male abutting surface bears against said female abutting surface, said male sealing surface then radially interfering with said female sealing surface, wherein the female annular shoulder zone comprises an internal peripheral surface, an internal first diameter of which at least in close proximity to said female abutting surface is smaller than a second diameter of the internal peripheral surface of the male lip, a ratio R of the first and second diameters being less than 1 but more than or equal to 0.9, wherein the ratio satisfies the relationship:

SQRT $(1.7-0.7S^2) \leq R \leq$ SQRT $(1.2-0.2S^2)$, in which S is equal to a ratio between a third diameter of an external edge of said male abutting surface and the second diameter of the male lip.

2. A tubular threaded connection according to claim 1, wherein the ratio R is substantially equal to $$\sqrt{1.3-0.3S^2}.$$

3. A tubular threaded connection according claim 1, wherein the internal peripheral surface of the female shoulder zone has a minimum diameter at a point where said internal peripheral surface intercepts a tapered surface of maximum shearing, coaxial with the female threaded element, having a vertex half-angle of 45°, wherein the diameter in the female shoulder zone decreases as distance increases from said female abutting surface and passes through an external edge of said female abutting surface.

4. A tubular threaded connection according to claim 1, wherein the first diameter of the internal peripheral surface of the female shoulder zone at its end on a side of said female abutting surface is substantially equal to the second diameter of the internal peripheral surface of the male lip.

5. A tubular threaded connection according to claim 4, wherein the internal peripheral surface of the female shoulder zone comprises a first transition portion, an internal diameter of which gradually decreases from said female abutting surface, and a second cylindrical portion with a minimum internal diameter.

6. A tubular threaded connection according to claim 5, wherein the transition portion and a cylindrical portion of the internal peripheral surface of the female should zone at a junction point located substantially half-way axially between an end of said transition portion on a side of the female abutting surface and a point of intersection of the internal peripheral surface of the female shoulder zone with a tapered surface of maximum shearing.

7. A tubular threaded connection according to claim 5, wherein said transition portion of the internal peripheral surface of the female shoulder zone comprises a tapered surface which is coaxial with the female threaded element and has a vertex half-angle in a range 15° to 45°.

8. A tubular threaded connection according to claim 5, wherein said transition portion of the internal peripheral surface of the female shoulder zone comprises a tapered surface which is coaxial with the female threaded element and has a vertex half-angle in a range 30° to 45°.

9. A tubular threaded connection according to claim 5, wherein said transition portion of the internal peripheral surface of the female shoulder zone comprises at least one toric surface that is coaxial with the female threaded element.

10. A tubular threaded connection according to claim 9, wherein said transition portion of the internal peripheral surface of the female shoulder zone comprises one toric surface, wherein a tangent at an end of the toric surface on a side of said female abutting surface forms an angle in a range 15° to 45° with an axis of the threaded connection.

11. A tubular threaded connection according to claim 9, wherein said transition portion of the internal peripheral surface of the female shoulder zone comprises one toric surface that is tangential at an end of the toric surface opposite said female abutting surface to the cylindrical portion of the internal peripheral surface of the female shoulder zone.

12. A tubular threaded connection according to claim 1, wherein said female and male abutting surfaces form reverse abutting surfaces with a negative angle with respect to an axis of the threaded elements, a dimension of which is 20° or less.

* * * * *